United States Patent [19]

Johnson et al.

[11] Patent Number: 5,130,004
[45] Date of Patent: Jul. 14, 1992

[54] PIGMENT GRINDING VEHICLES CONTAINING QUATERNARY AMMONIUM AND TERNARY SULFONIUM GROUPS

[75] Inventors: Mark W. Johnson, Glenshaw; Gregory J. McCollum, Gibsonia, both of Pa.

[73] Assignee: PPG Industries, Inc., Pittsburgh, Pa.

[21] Appl. No.: 481,812

[22] Filed: Feb. 20, 1990

Related U.S. Application Data

[63] Continuation of Ser. No. 177,194, Apr. 4, 1988, abandoned.

[51] Int. Cl.$^5$ .............................................. C25D 13/10
[52] U.S. Cl. .................. 204/181.7; 523/404; 523/414; 523/415; 523/420; 525/525; 525/526; 524/901
[58] Field of Search ............ 204/181.7; 523/404, 523/414, 415, 420; 525/525, 526; 524/901

[56] References Cited

U.S. PATENT DOCUMENTS

| | | | |
|---|---|---|---|
| 3,793,278 | 2/1974 | DeBona | 260/29.2 EP |
| 3,936,405 | 2/1976 | Sturni et al. | 260/29.2 EP |
| 3,959,106 | 5/1976 | Bosso et al. | 204/181 |
| 4,007,154 | 2/1977 | Schimmel et al. | 260/37 EP |
| 4,035,273 | 7/1977 | McGinniss | 204/181 |
| 4,066,523 | 1/1978 | McGinniss | 204/181.7 |
| 4,097,352 | 6/1978 | Bosso | 204/181.7 |
| 4,130,522 | 12/1978 | McGinniss | 260/29.2 TN |
| 4,186,124 | 1/1980 | Schimmel et al. | 260/37 EP |
| 4,260,716 | 4/1981 | Christenson | 204/181.7 |
| 4,292,155 | 9/1981 | Bosso | 204/181.7 |
| 4,468,307 | 8/1984 | Wismer | 204/181.7 |
| 4,715,898 | 12/1987 | Johnson | 106/308 Q |
| 4,780,524 | 10/1988 | Dobbelstein | 523/414 |

*Primary Examiner*—John Niebling
*Assistant Examiner*—Kishor Mayekar
*Attorney, Agent, or Firm*—William J. Uhl

[57] ABSTRACT

A pigment paste suitable for use in cationic electrodeposition is disclosed. The pigment paste comprises a cationic resinous grinding vehicle derived from an epoxy resin containing both quaternary ammonium and ternary sulfonium salt groups. Also disclosed are cationic electrodeposition paints containing the pigment paste and the use of these paints in the process of cationic electrodeposition. The paste improves the stability of lead-containing cationic electrodeposition paints.

13 Claims, No Drawings

PIGMENT GRINDING VEHICLES CONTAINING QUATERNARY AMMONIUM AND TERNARY SULFONIUM GROUPS

This application is a continuation of application Ser. No. 07/177,194, filed Apr. 4, 1988, abandoned.

BACKGROUND OF THE INVENTION

1. Field of the Invention

The present invention relates to novel pigment pastes, to cationic electrodeposition paints containing the novel pigment pastes and to the use of these paints in the process of cationic electrodeposition.

2. Brief Description of the Prior Art

In the formulation of paints and especially electrodeposition paints, an important factor is the introduction of pigments into the paint. The pigments are typically ground in a pigment grinding vehicle which acts as a dispersing agent to form a paste and the resultant pigment paste is blended with a main resinous vehicle and optionally diluents to form the paint. For electrodeposition paints, the pigment grinding vehicle preferably is a resinous material having the same charge as the main resinous vehicle so that it will electrodeposit with the main resinous vehicle. Typical pigment grinding vehicles for cationic electrodeposition are quaternary ammonium slat group-containing resins such as are described in U.S. Pat. Nos. 4,007,154 and 4,186,124. Also, ternary sulfonium salt group-containing resins such as described in U.S. Pat. 4,715,898 can also be used as pigment grinding vehicles.

One disadvantage associated with quaternary ammonium salt group-containing resins as pigment grinding vehicles is that they often result in relatively rough films. On the other hand, the sulfonium salt group-containing resins such as described in the aforementioned U.S. 4,715,898 offer an advantage over the quaternary ammonium salt group-containing resins in that they result in smoother electrodeposited films, particularly films which deposit at higher film builds. Unfortunately, it has been found that the sulfonium salt group-containing resins have a stability problem with lead-containing paints. Such paints for reasons which are not entirely understood are not particularly stable to the shearing forces the paint encounters when it passes through a recirculating pump typically used with industrial cationic electrodeposition baths. In addition, it has been found that lead-containing paints which additionally contain the pigment carbon black result in a particularly troublesome sedimentation which forms upon storage of the paint. Although the sedimentation problem can be overcome by using quaternary ammonium group-containing resins as the pigment grinding vehicles, rough films often result.

SUMMARY OF THE INVENTION

The present invention provides for a lead-containing cationic electrodeposition paint comprising a film-forming cationic electrodeposition resin, a pigment and a pigment grinding vehicle which is a cationic resin derived from an epoxy resin and containing both quaternary ammonium and ternary sulfonium groups.

In another embodiment, the invention provides for a pigment paste suitable for use in cationic electrodeposition comprising a cationic resinous grinding vehicle derived from an epoxy resin containing both quaternary ammonium and ternary sulfonium salt groups and a pigment component dispersed in the grinding vehicle. The pigment component contains a lead-containing pigment and the pigment to resin solids weight ratio being at least 2:1.

The invention also provides for a method of coating an electrically conductive substrate serving as a cathode in an electrical circuit comprising said cathode and an anode in an aqueous electrodeposition paint by passing electric current between the anode and the cathode to cause the paint to deposit on the cathode. The aqueous electrodeposition paint being the lead-containing cationic electrodeposition paint mentioned above.

DETAILED DESCRIPTION

The cationic resinous pigment grinding vehicle is derived from an epoxy resin. The epoxy resins which are used are typically polymeric polyepoxides which have a 1,2-epoxy equivalency greater than 1.0, that is, in which the average number of 1,2-epoxy groups per molecule is greater than one. Preferably, the epoxy resin will have an epoxy equivalency of 1.8 to 2.2, most preferably about 2.

A useful class of polyepoxides are the polyglycidyl ethers of polyphenols such as bisphenol F and bisphenol A, the latter being preferred. There may be prepared, for example, by etherification of the polyphenol with epichlorohydrin or dichlorohydrin in the presence of alkali. The polyphenol may be 2,2-bis(4-hydroxyphenyl)propane, 4,4'-dihydroxybenzophenone, 1,1-bis(4-hydroxy-phenyl)ethane, 4,4'-dihydroxydiphenylmethane or the like. Another quite useful class of polyepoxides are produced similarly from novolak resins or similar polyphenol resins.

Also suitable are polyglycidyl ethers of aliphatic and cycloaliphatic polyols such as ethylene glycol, diethylene glycol, 1,2-propylene glycol, 1,4-butylene glycol, glycerol, 2,2-bis-(4-hydroxycyclohexyl)propane, and the like.

Other epoxides which may be employed are acrylic polymers containing epoxy groups. Preferably, these acrylic polymers are polymers produced by copolymerizing a polymerizable ethylenically unsaturated epoxy group-containing monomer with at least one other ethylenically unsaturated monomer which is free of epoxy groups.

Examples of ethylenically unsaturated monomers containing epoxy groups are those containing monomer with at least one other ethylenically unsaturated monomer which is free of epoxy groups.

Examples of ethylenically unsaturated monomers which do not contain epoxy groups are alkyl esters of acrylic and methacrylic acid containing from 1 to 20 atoms in the alkyl group. Specific examples of these acrylates and methacrylates are methyl methacrylate, ethyl methacrylate, butyl methacrylate, ethyl acrylate, butyl acrylate and 2-ethylhexyl acrylate. Also, hydroxyalkyl esters of acrylic acid and methacrylic acid containing from 2 to 4 atoms in the hydroxyalkyl group can be used. Examples include hydroxyethyl methacrylate and hydroxypropyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The epoxy group-containing ethylenically unsaturated monomer is preferably used in amounts of from about 5 to 60, more preferably from 20 to 50 percent by weight of the total monomers used in preparing the epoxy-containing acrylic polymer. Of the remaining polymerizable ethylenically unsaturated monomers, preferably from 40 to 95 percent, more preferably from 50 to 80 percent by weight of the total monomers are the alkyl esters of acrylic and methacrylic acid.

The acrylic polymer may be prepared by solution polymerization techniques in the presence of suitable catalysts such as organic peroxides or azo compounds, for example, benzoyl peroxide or N,N'-azobis-(isobutyronitrile). The polymerization can be carried out in an organic solution in which the monomers are soluble. Suitable solvents are aromatic solvents such as xylene and toluene and ketones such as methyl amyl ketone. Alternately, the acrylic polymer may be prepared by aqueous emulsion or dispersion polymerization techniques.

The average molecular weight of the polyepoxide can vary from about at least 200 to about 50,000. The polyglycidyl ethers have relatively low molecular weights, that is, from about 200 to 3000, whereas the epoxy-containing acrylic polymers have relatively high molecular weights, that is, from about 1000 to 50,000. Preferably, the polyepoxide is a polyglycidyl ether of a polyphenol.

To incorporate the sulfonium and quaternary ammonium groups into the cationic resin, the epoxy resin is typically reacted with a sulfide-amine acid mixture. The sulfide employed may be virtually any sulfide which reacts with epoxy groups and which does not contain interfering groups. For example, the sulfide may be aliphatic, mixed aliphatic-aromatic, aralkyl or cyclic. Examples of such sulfides include diethyl sulfide, dipropyl sulfide, dibutyl sulfide, diphenyl sulfide, dihexyl sulfide, ethylphenyl sulfide, tetramethylene sulfide, pentamethylene sulfide, thiodiethanol, thiodipropanol, thiodibutanol and the like. Preferably, the sulfide is of the structure R-S-R' with R and R' being the same or different and being alkyl or hydroxyalkyl containing from 2 to 12 carbon atoms, preferably with at least one hydroxyl group being beta to sulfur. The most preferred sulfide is thiodiethanol.

The amine is preferably a tertiary amine. The amine may be unsubstituted or substituted with non-reactive substituents such as halogen or hydroxyl. Hydroxylamines such as alkanol and dialkanol amines are preferred. Examples include dimethylethanolamine, dimethylpropanolamine and methyldiethanolamine.

The acid employed may be virtually any acid which forms the desired ternary sulfonium and quaternary ammonium salts upon reaction with epoxy. Preferably, the acid is an organic carboxylic acid. Examples of acids which may be employed are boric acid, formic acid, lactic acid, acetic acid, propionic acid, butyric acid, dimethylolpropionic acid, hydrochloric acid, phosphoric acid and sulfuric acid, with the dimethylolpropionic acid being preferred.

The ratio of sulfide and amine to acid is not unduly critical. Since one mole of acid is utilized to form one mole of onium group (i.e., ternary sulfonium and quaternary ammonium salt group), it is preferred that at least one mole of acid be present for each mole of sulfide and each mole of amine.

Preferably, the pigment grinding vehicle should contain from 0.25 to 1.4 milliequivalents of onium salt group per gram of resin solids. Lower than the recommended amounts result in poor pigment wetting properties, whereas higher than the recommended amount results in vehicles which are too water soluble.

Preferably, the pigment grinding vehicle contains from 0.05 to 1.20 milliequivalents of quaternary ammonium salt groups and from 0.20 to 1.35 milliequivalents of ternary sulfonium salt groups per gram of resin solids to give the best blend of smoothness and stability in the resultant coating.

The sulfide-acid mixture and the epoxy resin are reacted by mixing the components usually at moderately elevated temperatures such as 60° to 95° C., preferably 70° to 85° C. Solvent is not necessary although one is often used in order to afford better control of the reaction. Preferably, the solvent is an alcohol and/or water. Examples of alcohols are monoalkyl ethers of ethylene glycol and of propylene glycol and aliphatic alcohols such as 2-butoxyethanol, 1-butoxy-2-propanol and butanol. Optionally, additional non-protic solvents such as methyl isobutyl ketone or toluene can be used.

Preferably, alkyl phenoxy groups are present in the grinding vehicle. The alkyl phenol provides for higher film builds. The alkyl phenoxy groups are typically of the structure:

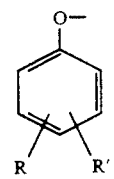

where R is an alkyl radical including branched and linear alkyl groups containing at least 4 and preferably from about 8 to 12 carbon atoms. Examples of alkyl groups include tertiary butyl, allyl, octyl, nonyl and dodecyl. R' can be hydrogen or an alkyl group of the type described for R. Examples of suitable alkyl phenoxy groups are those derived from alkyl phenols such as tertiary butyl phenol, allyl phenol, octyl phenol, nonyl phenol, dinonyl phenol and dodecyl phenol, with nonyl phenol being preferred.

The alkyl phenoxy groups are incorporated into the grinding vehicle by reacting the epoxy resin with the corresponding alkyl phenol. Reaction occurs readily, particularly in the presence of a catalyst such as ethyltriphenyl phosphonium iodide, benzyldimethylamine, 2-phenylimidazole or 2-ethyl-4-methylimidazole at a temperature of about 120° to 200° C., preferably 140° to 180° C. The epoxy resin and alkyl phenol can be reacted neat or preferably in the presence of a solvent such as xylene, methyl isobutyl ketone or 1-butoxy-2-propanol.

The order of reaction is not particularly critical although preferably the epoxy resin is reacted first with the alkyl phenol and then with the sulfide-amine acid mixture. Since both the alkyl phenol and sulfide-amine-acid mixture react with the epoxide functionality, the amounts and equivalents of the reactants should be controlled so as to get the desired product.

The amount of alkyl phenoxy groups in the cationic resin is preferably from 1.9 to 25, more preferably from 5 to 20 percent by weight based on total weight of cationic resin solids, that is, the weight of alkyl phenol divided by the total weight of reactants on a solid basis used in making the cationic resin.

Pigment pastes of the present invention are prepared by grinding or dispersing a pigment component which includes a lead-containing pigment into the grinding vehicle described above. For reasons not understood, lead in the cationic electrodeposition paints presents shear instability problems in the paint which the pigment grinding vehicles of the present invention help to stabilize.

Examples of lead-containing pigments are basic lead carbonate, basic lead silicate, lead oxide and lead cyanimide. Examples of other pigments which may be used include titanium dioxide, antimony oxide zinc oxide, barium carbonate, calcium carbonate, aluminum silicate, silica, magnesium carbonate and magnesium silicate. Color pigments may also be employed, for example, cadmium yellow, cadmium red, carbon black, phthalocyanine blue, chrome yellow, toluidine red and hydrated iron oxide. Carbon black in combination with the lead presents a sedimentation problem which the pigment grinding vehicles of the present invention help to stabilize.

Besides pigment and grinding vehicle, the paste in addition may contain optional ingredients such as wetting agents, surfactants and defoamers.

Grinding is usually accomplished by the use of ball mills, sand mills, Cowles dissolvers, continuous attritors and the like until the pigment has been reduced to a desired size and preferably has been wetted by and dispersed by the grinding vehicle. After grinding, the particle size of the pigment should be in the range of 10 microns or less, preferably as small as practical. Generally, a Hegman grind gauge reading of about 6 to 8, preferably 7 to 8, is employed.

Usually, grinding is conducted in an aqueous dispersion of the vehicle. The amount of water present in the aqueous grind should be sufficient to produce a continuous aqueous phase. The aqueous grind usually contains from about 30 to 70 percent solids. The use of more water merely reduces the effective capacity of the mill and while less water can be employed, higher resultant viscosity may create problems in certain instances. Although the pigment paste is usually prepared in the presence of water, water is not absolutely necessary and, in fact, the pigment dispersants of the present invention can be used to prepare nonaqueous pigment pastes which are subsequently dispersible in water-based compositions. The pigment-binder ratio in the grinding step is usually maintained within the range of about 1 to 10:1, preferably about 4 to 6:1.

Typically, the lead-containing pigment is present in the paste in amounts of 0.01 to 5.0 percent by weight based on total paste solids.

The carbon black when present is present in the paste in amounts of 0.01 to 5.0 percent based on total paste solids.

For a general review of pigment grinding in paint formulation, reference may be made to: D. H. Parker, *Principles of Surface Coating Technology*, Interscience Publishers, New York (1965); R. L. Yeates, *Electropainting*, Robert Draper Ltd., Teddington, England (1966); H. F. Payne, *Organic Coating Technology*, Vol. 2, Wiley and Sons, New York (1961).

For use in electrodeposition, the pigment paste is combined with a film-forming cationic electrodeposition resin which is the principal resin in the cationic electrodeposition process. Typically, the film-forming cationic electrodeposition resin will constitute from 5 to 19.5 percent by weight resin solids of the electrodeposition paint and the pigment grinding vehicle will constitute from 0.1 to 3 percent by weight resin solids of the electrodeposition paint.

Examples of cationic electrodepositable resins include amine salt group-containing resins such as the acid-solubilized reaction products of polyepoxides and primary or secondary amines such as those described in U.S. Pat. Nos. 3,663,389; 3,984,299; 3,947,338 and 3,947,339. Usually, these amine salt group-containing resins are used in combination with a blocked isocyanate curing agent. The isocyanate can be fully blocked as described in the aforementioned U.S. Pat. No. 3,984,299 or the isocyanate can be partially blocked and reacted with the resin backbone such as described in U.S. Pat. No. 3,947,338. Also, one-component compositions as described in U.S. Pat. No. 4,134,866 and DE-OS 2,707,405 can be used as the film-forming resin. Besides the epoxy-amine reaction products, film-forming resins can also be selected from cationic acrylic resins such as those described in U.S. Pat. Nos. 3,455,806 and 3,928,157.

Besides amine salt group-containing resins, quaternary ammonium salt group-containing resins can also be employed. Examples of these resins are those which are formed from reacting an organic polyepoxide with a tertiary amine salt. Such resins are described in U.S. Pat. Nos. 3,962,165; 3,975,346 and 4,001,101. Examples of other cationic resins are ternary sulfonium salt group-containing resins and quaternary phosphonium salt group-containing resins such as those described in U.S. Pat. Nos. 3,793,278 and 3,984,922, respectively. Also, film-forming resins which cure via transesterification such as described in European Application No. 12463 can be used. Further, cationic composition prepared from Mannich bases such as described in U.S. Pat. No. 4,134,932 can also be used.

Preferably, the cationic electrodepositable resin contains primary and/or secondary amine groups. Such resins are described in U.S. Pat. Nos. 3,663,389; 3,947,339 and 4,116,900. In U.S. Pat. No. 3,947,339, a polyketimine derivative of a polyamine such as diethylenetriamine or triethylenetetraamine is reacted with a polyepoxide. When the reaction product is neutralized with acid and dispersed in water, free primary amine groups are generated. Also, equivalent products are formed when polyepoxide is reacted with excess polyamines such as diethylenetriamine and triethylenetetraamine and the excess polyamine vacuum stripped from the reaction mixture. Such products are described in U.S. Pat. Nos. 3,663,389 and 4,116,900.

Enough of the pigment paste is used so that the final electrodepositable composition (electrodepositable resin plug pigment paste and optional ingredient) has the proper color, opacity, application and film properties required for electrodeposition. In most instances, the final electrodepositable composition has a pigment-to-binder (electrodepositable resin plus pigment dispersing vehicle) ratio of between about 0.01 to about 0.5.

For electrodeposition, a bath containing about 1 to 50, usually from 5 to 30 percent by weight solids, that is, pigment plus resinous vehicle, is usually employed. The final electrodepositable composition may contain in addition to the pigment dispersion and electrodeposition resin, adjuvant resins, solvents, anti-oxidants, surfactants and other adjuvants typically employed in an electrodeposition process.

Besides incorporating lead into the cationic electrodeposition paint through the pigment paste as described above, the lead can also be incorporated into the paint by simply adding a soluble lead salt such as lead acetate, lead lactate or lead oxide to the paint. Addition can be to the paint itself, to the pigment paste or to the cationic electrodepositable resin prior to combination with the paste to form the paint. Lead contents (both soluble and insoluble) of from 200 to 5000 parts per million based on total weight of cationic electrodeposition paint are typical.

For electrodeposition, the aqueous composition is placed in contact with an electrically conductive anode and electrically conductive cathode in an electric circuit. While in contact with the bath containing the coating composition, an adherent film of the coating composition is deposited on the cathode. The conditions under which the electrodeposition is carried out are, in general, similar to those used in the electrodeposition of other types of coatings. The applied voltage may be varied greatly and can be, for example, as low as one volt or as high as several thousand volts, although typically between 50 volts and 500 volts are usually employed. The current density is usually between about 0.25 ampere and 15 amperes per square foot and tends to decrease during electrodeposition. The method of the invention is applicable to the coating of any conductive substrate and especially metal such as steel, aluminum, copper and the like. After deposition, the coating is cured at elevated temperatures by any convenient method such as in baking ovens or with banks of infrared heat lamps. Curing temperatures of 200°–400° F. (93°–204° C.) and curing times of 10 to 60 minutes are typical.

Illustrating the invention are the following examples which are not to be construed as limiting the invention to their details. All parts and percentages in the examples as well as throughout the specification are by weight unless otherwise specified.

EXAMPLES

The following examples (I–IV) show the formulation of various cationic electrodeposition paints containing lead pigment and carbon black. Two paints (Examples I and III) were prepared using the pigment grinding vehicle of the present invention (Example F) which contained both ternary sulfonium and quaternary ammonium salt groups, and two paints (Examples II and IV) were prepared using the pigment grinding vehicle of the prior art (Example E) which contained only ternary sulfonium groups. The paints were evaluated for pump stability and for stability against sedimenting.

In preparing the cationic electrodeposition paints, the following cationic resin, additive, pigment grinding vehicles, pigment pastes and catalyst pastes were used.

Example A

A cationic film-forming resin was prepared by reacting a polyepoxide with N-methlethanolamine and the methyl isobutyl diketimine of diethylenetriamine. The reaction product was combined with a fully blocked polyisocyanate and solubilized with acid as generally described in Example 2 of European Application 236,050.

ADDITIVE

Example B

A polyoxyalkylenepolyamine-polyepoxide adduct having an amine to epoxide equivalent ratio of 1.34/1 was prepared, solubilized with lactic acid and dispersed in water (solids content 38.7 percent) as generally described in Example J of U.S. Pat. No. 4,615,779.

PIGMENT GRINDING VEHICLE

Example C

A pigment grinding vehicle was prepared as generally described in Example M of U.S. Pat. No. 4,615,779.

Example E

A pigment grinding vehicle was prepared by reacting a polyglycidyl ether of bisphenol A with nonyl phenol (1.9 percent by weight) and thiodiethanol and dimethylolpropionic acid (0.992 milliequivalents of sulfonium per gram of resin) as follows:

| Ingredients | Parts by Weight (in grams) | Solids (in grams) | Equivalents |
|---|---|---|---|
| EPON 828[1] | 533.2 | 533.2 | 2.836 |
| Bisphenol A | 199.6 | 199.6 | 1.751 |
| Nonyl phenol | 19.2 | 19.2 | 0.086 |
| Ethyltriphenyl phosphonium iodide | 0.75 | — | — |
| Monobutyl ether of propylene glycol | 201.6 | — | — |
| Thiodiethanol | 122.1 | 122.1 | 1.0 |
| Dimethylolpropionic acid | 134.1 | 134.1 | 1.0 |
| Deionized water | 30.6 | — | — |

[1]Polyglycidyl ether of bisphenol A, available from Shell Chemical Co.

The EPON 828, bisphenol A and nonyl phenol were charged to a reaction vessel and heated to 107° C. and held at this temperature until the bisphenol A dissolves. The ethyltriphenyl phosphonium iodide was then added and the reaction mixture heated to 125°0 C. to initiate an exotherm. The reaction mixture was maintained at exotherm for about one hour until a viscosity of P (measured as a 50 percent resin solids solution in 2-methoxypropanol, DOWANOL PM) was obtained (epoxy equivalent weight of about 763). The reaction mixture was cooled at 75° C. followed by the addition of the monobutyl ether of propylene glycol, thiodiethanol, dimethylolpropionic acid and water. The reaction mixture was heated to 70°–75° C. and held at this temperature until an acid value of 3.36 was obtained. The reaction mixture was then cooled and thinned with additional water to a solids content of 36.2 percent.

Example F

A pigment grinding vehicle similar to Example E was prepared but in which the polyglycidyl ether of bisphenol A was reacted with a mixture of thiodiethanol and dimethylethanolamine to form a vehicle containing both ternary sulfonium and quaternary ammonium groups.

| Ingredients | Parts by Weight (in grams) | Solids (in grams) | Equivalents |
|---|---|---|---|
| EPON 828 | 533.2 | 533.2 | 2.836 |
| Bisphenol A | 199.6 | 199.6 | 1.751 |
| Nonyl phenol | 19.2 | 19.2 | 0.086 |
| Ethyltriphenyl phosphonium iodide | 0.5 | — | — |
| Monobutyl ether of propylene glycol | 200.5 | — | — |
| Sulfide-amine mixture[1] | 177.3 | 146.7 | 0.785 (sulfide) 0.215 (amine) 0.237 (acid) |
| Dimethylolpropionic | 102.3 | 102.3 | 0.763 |

-continued acid

[1] The sulfide-amine mixture was prepared from the following ingredients:

| Ingredients | Parts by Weight (in grams) | Solids (in grams) | Equivalents |
|---|---|---|---|
| Thiodiethanol | 287.4 | 287.4 | 2.355 |
| Dimethylethanolamine | 57.6 | 57.6 | 0.645 |
| Dimethylolpropionic acid | 95.1 | 95.1 | 0.710 |
| Deionized water | 91.8 | — | — |

The thiodiethanol and dimethylethanolamine were charged to a reaction vessel and mixed. Dimethylolpropionic acid and water were then added and the mixture stirred at 60° C. until a solution was obtained.

The EPON 828, bisphenol A and nonyl phenol were charged to a reaction vessel and heated to 107° C. and held at this temperature until the bisphenol A dissolves. The ethyltriphenyl phosphonium iodide was then added and the reaction mixture heated to 125° C. to initiate an exotherm. The reaction mixture was maintained at exotherm for about one hour until a viscosity of P (50 percent in DOWANOL PM, epoxy equivalent of 775) was achieved. After addition of the monobutyl ether of propylene glycol, sulfide-amine mixture and dimethylolpropionic acid, the reactants were heated to 70°–75° C. until an acid value of 5.61 was obtained. The reaction mixture was cooled and thinned with deionized water to a solids content of 32.1 percent.

CATALYST PASTE

Example G

Dibutyltin oxide catalyst was dispersed in the grinding vehicle prepared as described above in Example C in the following charge ratio:

| Ingredients | Parts by Weight |
|---|---|
| Quaternary ammonium salt group-containing pigment grinding vehicle prepared as described in Example C | 145 |
| Deionized water | 321.6 |
| Dibutyltin oxide | 200 |

The above ingredients were mixed together and ground in a mill to a Hegman No. 7 grind.

Example H

Dibutyltin oxide catalyst was dispersed in the grinding vehicle prepared as described above in Example E in the following charge ratio:

| Ingredients | Parts by Weight (in grams) |
|---|---|
| Ternary sulfonium salt group-containing pigment grinding vehicle prepared as described above in Example E | 735.2 |
| SURFYNOL 104E[1] | 2.25 |
| Deionized water | 340.7 |
| Dibutyltin oxide | 562.5 |

[1] Acetylenic alcohol available from Air Products and Chemicals Inc.

The above ingredients were mixed together and ground in a sand mill for 3 hours to a Hegman No. 7 grind.

Example J

Dibutyltin oxide catalyst was dispersed in the grinding vehicle prepared as described above in Example F in the following charge ratio:

| Ingredients | Parts by Weight (in grams) |
|---|---|
| Mixed quaternary ammonium-ternary sulfonium salt group-containing pigment grinding vehicle prepared as described above in Example F | 732.9 |
| Deionized water | 363.2 |
| Dibutyltin oxide | 500.0 |

The above ingredients were mixed together and ground in a sand mill for 3 hours to a Hegman No. 7 grind.

PIGMENT PASTE

Example K

A pigment paste was prepared by dispersing clay, titanium dioxide and lead silicate in the pigment vehicle of Example E as follows:

| Ingredients | Parts by Weight (in grams) |
|---|---|
| Pigment grinding vehicle of Example E | 498.0 |
| Catalyst paste of Example H | 116.4 |
| Deionized water | 206.4 |
| Clay | 16.8 |
| Titanium dioxide | 701.0 |
| Lead silicate | 61.4 |

The above ingredients were ground together in a sand mill for 45 minutes to a Hegman No. 7 grind.

Example L

A pigment paste was prepared by dispersing clay, titanium dioxide and lead silicate in the pigment grinding vehicle of Example F as follows:

| Ingredients | Parts by Weight (in grams) |
|---|---|
| Pigment grinding vehicle of Example F | 482.3 |
| Deionized water | 222.1 |
| Catalyst paste | 116.4 |
| Clay | 16.8 |
| Titanium dioxide | 701.0 |
| Lead silicate | 61.4 |

The ingredients were ground together in a sand mill for 45 minutes to a Hegman No. 7 grind.

Example M

A pigment paste was prepared by dispersing lead silicate, carbon black and titanium dioxide in a mixed pigment grinding vehicle consisting of the pigment grinding vehicle of Example F and of Example C.

| Ingredients | Parts by Weight (in grams) |
|---|---|
| Pigment grinding vehicle of Example F | 275.3 |
| Deionized water | 286.5 |
| Pigment grinding vehicle of Example C | 177.9 |
| Lead silicate | 64.3 |
| Carbon black | 28.4 |

| Ingredients | Parts by Weight (in grams) |
|---|---|
| Titanium dioxide | 848.3 |
| Catalyst paste of Example G | 179.3 |

The ingredients were ground together in a sand mill to a Hegman No. 7 grind.

Example N

A pigment paste was prepared by dispersing lead silicate, carbon black and titanium dioxide in a mixed pigment grinding vehicle consisting of the pigment vehicle of Example E and Example C.

| Ingredients | Parts by Weight (in grams) |
|---|---|
| Pigment grinding vehicle of Example E | 270.1 |
| Deionized water | 291.7 |
| Pigment grinding vehicle of Example C | 177.9 |
| Lead silicate | 64.3 |
| Carbon black | 28.4 |
| Titanium dioxide | 848.3 |
| Catalyst paste of Example G | 179.3 |

The above ingredients were ground in a sand mill to a Hegman No. 7 grind.

The pigment grinding vehicle prepared as described immediately above (500.1 grams) was mixed with an additional 8 grams of deionized water to form the final pigment paste.

PAINTS

Example I

A cationic electrodeposition paint was prepared by mixing together the following ingredients in the order indicated in a one gallon paint can under agitation from an overhead stirrer:

| Ingredients | Parts by Weight (in grams) |
|---|---|
| Cationic resin of Example A | 1457.6 |
| Additive of Example B | 160.5 |
| Plasticizer[1] | 37.9 |
| Deionized water | 1751.9 |
| Pigment paste of Example K | 392.1 |

[1]Propoxylated cresol available from Rohm and Haas Co. as WP 1.

The paint formulated as described above was tested for pump stability and resistance to sedimentation. The results are reported in the table below.

Example II

A cationic electrodeposition paint was prepared as generally described in Example I from the following ingredients:

| Ingredients | Parts by Weight (in grams) |
|---|---|
| Cationic resin of Example A | 1457.3 |
| Additive of Example B | 160.5 |
| Plasticizer of Example I | 37.9 |
| Deionized water | 1749.4 |
| Pigment paste of Example L | 394.4 |

Example III

A cationic electrodeposition paint was prepared as generally described above in Example I from the following ingredients:

| Ingredients | Parts by Weight (in grams) |
|---|---|
| Cationic resin of Example A | 1328.8 |
| Additive of Example B | 146.3 |
| Plasticizer of Example I | 34.5 |
| Deionized water | 1942.3 |
| Pigment paste of Example M | 348.1 |

The cationic electrodeposition paint was passed through an ultrafilter to the extent of 20 percent of its volume. The ultrafiltrate was replaced with deionized water. Phosphated (BONDERITE 40) steel panels were cathodically electrodeposited in the paint at a voltage of 275 volts for 2 minutes at a bath temperature of 83° F. (28° C.) to form a continuous film. The paint was tested for pump stability and for resistance to sedimentation. The results are reported in the table below.

Example IV

A cationic electrodeposition paint was prepared as generally described above in Example I as follows:

| Ingredients | Parts by Weight (in grams) |
|---|---|
| Cationic resin of Example A | 1328.9 |
| Additive of Example B | 146.3 |
| Plasticizer of Example I | 34.5 |
| Deionized water | 1983.7 |
| Pigment paste of Example N | 342.6 |

The paint was passed through an ultrafilter to 20 percent of its initial volume and the ultrafiltrate replaced with deionized water. Phosphated steel panels were cathodically electrodeposited in the bath at 275 volts for 2 minutes at a bath temperature of 83° F. (28° C.) to form a continuous film. The paint was tested for pump stability and for resistance to sedimentation. The results are reported in the table below.

TABLE

Pump Stability and Resistance to Sedimentation of Paints of Examples I-IV

| Paint Example No. | Pigment Grinding Vehicle (Example) | Pigment Grinding Vehicle (Type) | Pump Stability[1] (grams) | Sedimentation Rating[2] |
|---|---|---|---|---|
| I | E | ternary sulfonium | 5.2 | 0/0 |
| II | F | mixed ternary sulfonium-quaternary ammonium | 2.2 | 5/8 |
| III | F + C | mixed sulfonium-quaternary ammonium + quaternary ammonium | 0.3 | 9½/10 |
| IV | E + C | ternary sulfonium + quaternary ammonium | 5.9 | 2/0 |

[1]The pump stability is a measure of the resistance of the paint to shearing forces. The pump stability was determined by recirculating one gallon of paint in a centrifugal pump (Little Giant 4MD) for 8 hours at a paint temperature of 90° F. (32° C.). The pigment pastes used in formulating the paints were heat aged for 3 days at

TABLE-continued

140° F. (60° C.) prior to formulation. The paint is then passed through a 200-mesh screen and the grams of sludge collected on the screen is weighed and reported. The lower the amount of sludge collected, the greater the pump stability.

[2] The sedimentation rating is a measure of the sedimenting tendency of the paint and the ease of reincorporating the sediment back into the paint. The pigment pastes used in formulating the paints were heat aged for 3 days at 140° F. (60° C.) prior to formulation. In determining the sedimentation rating, a sample of the paint is placed in a 4-ounce glass jar and allowed to stand at room temperature for 7 hours. The jar is then placed in an oven at 140° F. (60° C.) for 8 hours. The jar is then removed from the oven, allowed to cool at room temperature and placed upside down in a Burell Model 75 wrist action shaker. Shaking is continued for 30 minutes. The reincorporation of sediment back into the paint is evaluated and given a first rating. The jar is removed from the shaker and the bottom of the jar scraped thoroughly with a spatula. The jar is shaken an additional 30 minutes, removed from the shaker and allowed to stand in an upright position for an additional 10 minutes. The reincorporation of the sediment back into the paint is given a second rating. A value of 10 is rated as excellent and 0 is rated very poor.

We claim

1. A pigment paste suitable for cationic electrodeposition consisting essentially of:
   (a) a cationic resinous grinding vehicle derived from an epoxy resin and containing salt groups consisting essentially of both quaternary ammonium and ternary sulfonium whereby said cationic resinous grinding vehicle is formed by simultaneously treating the epoxy resin with an acidified sulfide amine mixture.
   (b) a pigment component dispersed in the grinding vehicle, said pigment component containing a lead-containing pigment;
the pigment component to cationic resinous grinding vehicle solids weight ratio being at least 2:0.

2. The pigment paste of claim 1 in which the epoxy resin is a polyglycidyl ether of a polyphenol.

3. The pigment paste of claim 1 which contains from 0.05 to 1.20 milliequivalents of quaternary ammonium salt groups and 0.20 to 1.35 milliequivalents of ternary sulfonium salt groups per gram of resin solids.

4. The pigment paste of claim 1 in which the lead-containing pigment is basic lead silicate.

5. The pigment paste of claim 1 in which the lead-containing pigment is present in the pigment paste in amounts of 0.01 to 5.0 percent by weight based on total pigment paste solids.

6. The pigment paste of claim 1 in which the pigment component additionally contains carbon black.

7. The pigment paste of claim 6 in which the carbon black is present in amounts of 0.01 to 5.0 percent by weight based on total pigment paste solids.

8. The pigment paste of claim 1 in which the pigment component to cationic resinous grinding vehicle solids weight ratio is from 2to 7:1.

9. A cationic electrodeposition paint consisting essentially of a film-forming cationic electrodepositable resin, a pigment and a pigment grinding vehicle, said paint containing lead, characterized in that the pigment grinding vehicle is a cationic resin derived from an epoxy resin and containing salt groups consisting essentially of both quaternary ammonium and ternary sulfonium whereby said cationic resin is formed by simultaneously treating the epoxy resin with an acidified sulfide amine mixture.

10. The cationic paint of claim 9 which contains from 200 to 5000 parts per million lead based on total paint weight.

11. The cationic paint of claim 9 in which the epoxy resin is a polyglycidyl ether of a polyphenol.

12. The cationic paint of claim 9 in which the pigment grinding vehicle contains from 0.05 to 1.20 milliequivalents of quaternary ammonium salt group and from 0.20 to 1.35 milliequivalents of ternary sulfonium salt group per gram of pigment grinding vehicle solids.

13. In a method of coating an electrically conductive substrate serving as a cathode in an electrical circuit comprising said cathode and an anode in an aqueous electrodeposition paint by passing electric current between said cathode and said anode to cause the paint to deposit on the cathode wherein the improvement comprises using in said method an aqueous electrodeposition paint which consists essentially of a film-forming cationic electrodepositable resin, a pigment and a pigment grinding vehicle, said paint containing lead, characterized in that the pigment grinding vehicle is a cationic resin derived from an epoxy resin and containing salt groups consisting essentially of both quaternary ammonium and ternary sulfonium whereby said cationic resin is formed by simultaneously treating the epoxy resin with an acidified sulfide amine mixture.

* * * * *

UNITED STATES PATENT AND TRADEMARK OFFICE
CERTIFICATE OF CORRECTION

PATENT NO.  : 5,130,004

DATED       : July 14, 1992

INVENTOR(S) : Mark W. Johnson et al

It is certified that error appears in the above-identified patent and that said Letters Patent is hereby corrected as shown below:

Column 13, line 37, change "2:0" to --2:1--.

Signed and Sealed this

Twenty-first Day of September, 1993

Attest:

BRUCE LEHMAN

*Attesting Officer*       *Commissioner of Patents and Trademarks*